Jan. 9, 1940.  J. EGGERT ET AL  2,186,717
PRODUCTION OF COLORED PHOTOGRAPHIC PICTURES
Filed April 4, 1936
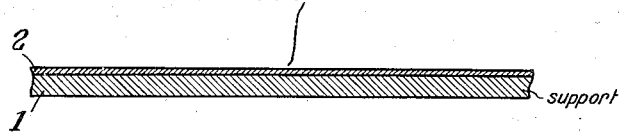
Inventors
John Eggert
Alfred Froehlich
By Their Attorneys
Stutz and Joslin Patented Jan. 9, 1940

2,186,717

UNITED STATES PATENT OFFICE 2,186,717

PRODUCTION OF COLORED PHOTOGRAPHIC PICTURES

John Eggert, Leipzig-Gohlis, and Alfred Fröhlich, Dessau, Germany, assignors, by mesne assignments, to Agfa Ansco Corporation, Binghamton, N. Y., a corporation of Delaware Application April 4, 1936, Serial No. 72,714
In Germany April 12, 1935

5 Claims. (Cl. 95—6)

Our present invention relates to the manufacture of color pictures and more particularly to the manufacture of color pictures by the method in which the color is produced in the development.

One of its objects is to provide a process for the production of improved color pictures. Another object is the film serving as the starting material for the production of the improved pictures. Further objects will be seen from the detailed specification following hereafter.

In the manufacture of colored pictures by photography the dyestuff that yields the picture is frequently produced directly or indirectly from its components with the aid of the silver image in the photographic layer, in which case one or more of these components are contained in a form insoluble in water in the gelatin or the silver halide emulsion before the casting operation. Since these bodies in a form insoluble in water have to be subjected to a chemical reaction in the gelatin and as the transparency of the gelatin layer must not be affected at all these component bodies must be in a very finely dispersed condition in the gelatin layer.

According to this invention it has been found that finest dispersion of dyestuff components or dyestuff-intermediates which form colors in development with the developer or more exactly with its oxidation products, and which are precipitated from their solution when the latter is mixed with an aqueous solution of gelatin may be obtained in the gelatin solution by adding to the solution of the gelatin or the color or both an agent known under the term wetting agent or dispersing agent or emulsifying agent and hereinafter called wetting agent. It has proved advantageous to add the wetting agent to the gelatin solution. In this case the highest possible degree of transparency is attained both for the gelatin layer and for the dyestuff produced, owing to the very fine distribution of the intermediate product. In many cases this condition of a wetting agent prevents precipitation of the component by water or a reagent in the gelatin solution. The effect of the wetting agent varies greatly. If the dyestuff-intermediate is added to the gelatin solution in an alkaline solution the latter must be neutralized, whereby the component is precipitated. If the solution is only weakly alkaline, the buffering power of the gelatin may be sufficient and precipitation occurs with the mixing process, or if the solution is more strongly alkaline neutralization may be effected by means of acids or acid salts in which case precipitation occurs in the finished mixture on addition of the neutralizing agent. In case of the dyestuff component being acid it may be added to the gelatin solution in the form of the sodium salt which is dissolved in water. In drying the salt would crystallize in the gelatin if the wetting agent were not added. Thus, in any case the addition of a wetting agent guarantees the finest distribution of the dyestuff component in the gelatin or gelatino silver halide emulsion. The wetting agent is added in an amount of about 2 to 20 grams and the dyestuff component in an amount of about 5 to 30 grams per one kilo of silver halide emulsion ready for being cast and containing usually about 9 per cent of gelatin. Preferably there are used equal quantities of dyestuff component and wetting agent.

The wetting agent may be wholly or partly withdrawn again from the gelatin solution or the silver halide emulsion before the casting by a washing operation without thereby affecting the high dispersion of the dyestuff intermediate product. The wetting agent may be removed also before the finishing of the silver halide emulsion by dispersing the intermediate product in a gelatin solution by means of a wetting agent, washing out the wetting agent after solidification and mixing this dyestuff component-gelatin with a silver halide emulsion or making the emulsion with this gelatin.

Solvents for the dyestuff intermediates which enter into consideration for the purpose of the invention are, for instance, methanol, alcohol, acetone, a caustic soda solution, a caustic potassium solution, a solution of sodium carbonate, and ammonia. From the solution in these solvents the dyestuff-intermediate is precipitated in a too coarse form when they are mixed with an aqueous solution of gelatin without the addition of a wetting agent in accordance with the invention. Suitable wetting agents are, for instance, calcium glycerin-phosphate, potassium stearate, the oleic acid ester of hydroxyethane-sulfonic acid ($HO_3S.CH_2.CH_2.OOC.C_{17}H_{33}$), sulfonated castor oils, purified and neutralized sulfite waste liquor, sulfonated soya-lecithin, saponines, sulfonated higher molecular primary or secondary aliphatic-aromatic, cyclo-aliphatic, aliphatic or aromatic carbonic acids, such as naphthenic acid, cholic acid, cinnamic acid and the like, sulfonated oleyl-alcohol, 1-ω-sulfoethylamino-2-aminobenzene-4-sulfo-dodecylamide corresponding with the formula,

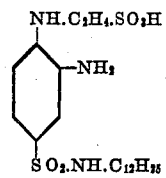

the products which result from sulfonating hydrated mono-hydroxy-diarylmethanes and mono-hydroxy-triarlylmethanes, sulfonated naphthylphenols and sulfonated naphthylcresols, sulfonated cetyl-mono-glycerinether, and the product resulting from amidizing oleic acid with the symmetrical diethylethylenediamine corresponding with the formula

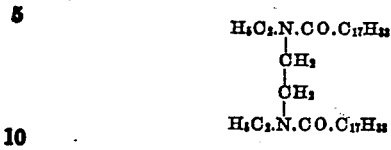

Dyestuff components which are soluble in methanol, alcohol and acetone are, for instance, xylidine, naphthylamine, diphenylamine, aminochrysen and aminopyren; dyestuff components which are soluble in a caustic soda solution or a caustic potassium solution and some of which are also soluble in methanol are, for instance, 2.3-hydroxynaphthoic-acid-dianisidide corresponding with the formula

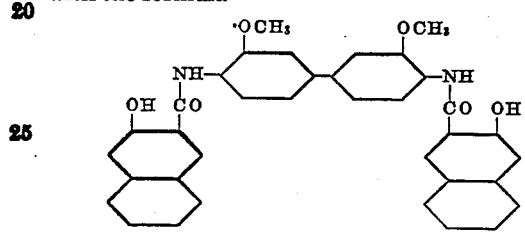

2.3 - hydroxynaphthoic-acid - β - naphthylamide, 2.3-hydroxynaphthoic-acid-2-toluidide, 1.2-hydroxynaphthoic-acid-dibenzidide, 1.2-hydroxynaphthoic-acid-diphenylamide, symmetrical urea from 4''-aminobenzoyl-3'-aminophenyl-3-methyl-5-pyrazolon corresponding with the formula

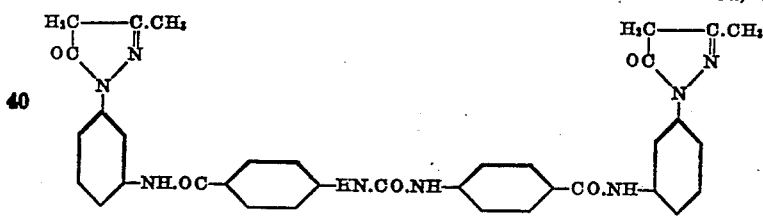

from 4'-aminobenzoyl-I-acid, from 3'-aminobenzoyl-K-acid, (the latter two compounds are soluble in a solution of sodium carbonate), from 1.2-hydroxynaphthoic-acid-4'-amino-anilide, from 4'-aminophenyl-3-methyl-5-pyrazolon, the 1.2-hydroxynaphthoic-acid-arylide from 4.4'-diamino-diphenylmethane corresponding with the formula

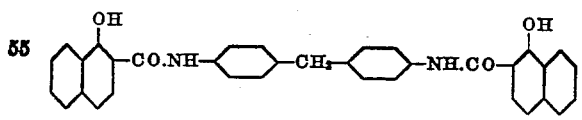

6-methoxy-2.3 - hydroxynaphthoic-acid-2'-toluidide, di-acetoacetic-acid-tolidide corresponding with the formula

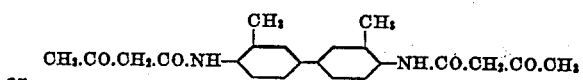

dibenzoylacetic - acid - benzidide, benzoylacetic-acid-α-naphthylamide, terephthaloyl-bis-acetic-acid-anilide, terephthaloyl-bis-acetic-acid-toluidide, terephthaloyl-bis-acetic-acid-o-chloranilide, terephthaloyl-bis-acetic-acid-p-anisidide, a condensation product from 1 molecular proportion of cyanurtrichloride, from 1 molecular proportion of 1.8-amino-naphthol and 2 molecular proportions of aniline, from 1 molecular proportion of 4.4'-diphenyldicarbonic acid chloride and 2 molecular proportions of 4'-aminodiphenylpyrazolon corresponding with the formula

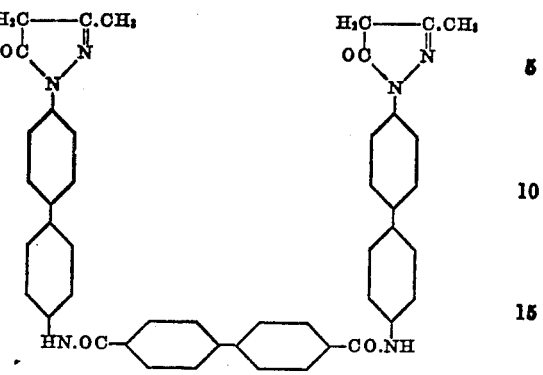

and 4'-hydroxydiphenylamine-3'-carbonic-acid-dibenzidide.

If gelatin containing 2.3-hydroxynaphthoic acid-dianisidide is acidified with acetic acid the Naphthol-AS component separates in the form of flocks. If before the gelatin is acidified there is added calcium glycerophosphate there is obtained on addition of acid an opalescent solution which dries to a glass-clear condition. In a layer of such gelatin there can be produced transparent pictures in dyestuff, for example with the aid of a diazo-compound.

If to a gelatin solution or silver halide emulsion containing the sodium salt of the oleic acid ester of hydroxyethane sulfonic acid, there is added an alkaline solution of terephthaloyl-bis-acetic acid-anilide and the solution or emulsion is acidified, and the silver halide is dissolved

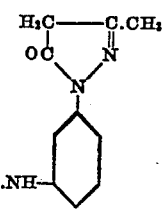

from the dried silver halide emulsion, there remains a glass-clear gelatin layer. This emulsion is developed with a solution of para-aminodimethyl-aniline, alkaline with sodium carbonate; there is obtained a yellow picture.

If to a halogen silver emulsion, containing sulfonated castor oil, such as is sold, for example, by the Firm Stockhausen under the registered name "Prästabitöl", there is added an alkaline solution of the unsymmetrical urea of para-aminobenzoyl-meta - aminophenylmethylpyrazolon and the whole is acidified no precipitation of the dyestuff component occurs. When this emulsion is developed with diethylamino-para-aminobenzene there is obtained a red picture.

If to a gelatin solution containing sulfonic acid of lignin, for example purified and neutralized sulfite waste liquor, there is added an alkaline solution of 2.3-hydroxynaphthoic-acid-2-anilide and the solution is acidified, the gelatin will subsequently dry to a glass-clear condition. If this gelatin is printed by means of a gelatin relief saturated with the diazo-solution from para-nitraniline there is obtained a red azo-dyestuff picture.

The single figure of the accompanying drawing shows a film in accordance with the invention. The support 1 carries a silver halide emulsion layer 2 containing a dyestuff component and a wetting agent.

What we claim is:

1. A gelatino-silver-halide emulsion containing a dyestuff component capable of forming a dye with a developer adapted for color development, said dye component although soluble in aqueous photographic developing solutions being of such molecular constitution that it is incapable in such dissolved form of diffusing in gelatine in any photographic treating bath, said dyestuff component being present in the emulsion in a finely dispersed state in an amount ranging from 5 to 30 grams per kilogram of emulsion, said component being finely dispersed in the gelatine by the use of 2 to 20 grams of a wetting agent per kilogram of emulsion.

2. A gelatino-silver-halide emulsion containing from 5 to 30 grams per kilogram of emulsion of a dyestuff component capable of forming a dye with a developer adapted for color development, said dye component although soluble in aqueous photographic developing solutions being of such molecular constitution that it is incapable in such dissolved form of diffusing in gelatine in any photographic treating bath, and about 2 to 20 grams of a wetting agent per kilogram of emulsion, said dyestuff component being finely dispersed in said emulsion.

3. The emulsion as defined in claim 1 wherein the dyestuff component and wetting agent are employed in equal amounts.

4. The emulsion as defined in claim 1 wherein the emulsion contains about 9% of gelatine.

5. The emulsion as defined in claim 1 wherein the dyestuff component is a hydroxy naphthoic acid compound.

JOHN EGGERT.
ALFRED FRÖHLICH.